United States Patent
Bassman et al.

(10) Patent No.: US 6,408,334 B1
(45) Date of Patent: Jun. 18, 2002

(54) COMMUNICATIONS SYSTEM FOR MULTIPLE COMPUTER SYSTEM MANAGEMENT CIRCUITS

(75) Inventors: Robert G. Bassman; Anil V. Rao; Philip D. Chidester; Donald E. Carroll, all of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/229,736

(22) Filed: Jan. 13, 1999

(51) Int. Cl.$^7$ .............................................. G06F 13/00
(52) U.S. Cl. ....................... 709/223; 709/220; 709/222
(58) Field of Search ................................ 709/220, 221, 709/222, 223, 224

(56) References Cited

U.S. PATENT DOCUMENTS

| | | | |
|---|---|---|---|
| 4,293,948 A | 10/1981 | Soderblom | 370/424 |
| 4,298,860 A | 11/1981 | Norberg et al. | 340/2.4 |
| 4,346,446 A | 8/1982 | Erbstein et al. | 702/182 |
| 4,356,545 A | 10/1982 | West | 714/46 |
| 4,386,426 A | 5/1983 | Pugh | 370/438 |
| 4,439,856 A | 3/1984 | Ulug | 370/419 |
| 4,464,749 A | 8/1984 | Ulug | 370/451 |
| 4,517,670 A | 5/1985 | Ulug | 370/463 |
| 4,569,044 A | 2/1986 | Tao et al. | 370/451 |
| 4,614,944 A | 9/1986 | Schwan | 340/3.61 |
| 4,680,788 A | 7/1987 | Cordeiro et al. | 379/93.09 |
| 4,689,786 A | 8/1987 | Sidhu et al. | 370/255 |
| 4,862,158 A | 8/1989 | Keller et al. | 370/439 |
| 5,210,530 A * | 5/1993 | Kammerer et al. | 340/3.51 |
| 5,224,207 A | 6/1993 | Filion et al. | 358/61 |
| 5,331,318 A | 7/1994 | Montgomery | 340/855.4 |
| 5,367,670 A | 11/1994 | Ward et al. | 714/47 |
| 5,402,431 A | 3/1995 | Saadeh et al. | 714/47 |
| 5,410,706 A | 4/1995 | Farrand et al. | 713/23 |
| 5,440,699 A | 8/1995 | Farrand et al. | 345/740 |
| 5,485,576 A | 1/1996 | Fee et al. | 714/56 |
| 5,502,838 A | 3/1996 | Kikinis | 713/501 |
| 5,519,878 A | 5/1996 | Dolin, Jr. | 709/220 |
| 5,596,723 A | 1/1997 | Romohr | 709/222 |
| 5,630,066 A | 5/1997 | Gosling | 709/221 |
| 5,631,874 A | 5/1997 | Mastin et al. | 367/15 |
| 5,636,342 A | 6/1997 | Jeffries | 714/48 |
| 5,701,411 A | 12/1997 | Tran et al. | 709/250 |
| 5,732,212 A * | 3/1998 | Perholtz et al. | 709/224 |
| 5,754,445 A | 5/1998 | Jouper et al. | 700/295 |
| 6,070,253 A * | 5/2000 | Tavallaei et al. | 714/31 |
| 6,119,159 A * | 9/2000 | Tseng et al. | 709/224 |
| 6,219,708 B1 * | 4/2001 | Martenson | 709/226 |

FOREIGN PATENT DOCUMENTS

EP 0 522 590 A1 1/1993

OTHER PUBLICATIONS

Anil V. Rao; Robert G. Bassman; Wai–Ming Richard Chan; Joseph A. Vivio, "Console Redirection For A Computer System", Oct. 19, 1998, 09/174,741,23 pages, 7 sheets of drawings (Figs. 1–7).

* cited by examiner

Primary Examiner—Kenneth R. Coulter (57) ABSTRACT

A communications system for multiple computer system management circuits to enable remote management of the computer systems via a remote management system. The management circuits are operably coupled to a remote connector circuit via a communications bus (e.g. a bus conforming to the RS-485 communications standard). The remote connector circuit can be implemented on a daughter card of one of the computer systems. The remote connector circuit includes modem circuitry for providing operating information on operating conditions of the computer systems to a remote management system and for receiving operating commands to be provided to the management circuits wherein the computer systems initiate operations (e.g. rebooting and power cycle) in response to receiving the commands. The RS-485 bus is configured in a daisy chain configuration to allow for a simplified addition of new computer systems to the bus.

62 Claims, 5 Drawing Sheets

COMMUNICATIONS SYSTEM FOR MULTIPLE COMPUTER SYSTEM MANAGEMENT CIRCUITS

BACKGROUND OF THE INVENTION

1. Field of the Invention

This invention relates in general to computer systems and specifically to a communications system for multiple computer system management circuits.

2. Description of the Related Art

Computer systems are information handling systems which can be designed to give independent computing power to one user or a plurality of users. Computer systems may be found in many forms including, for example, mainframes, minicomputers, workstations, servers, personal computers, internet terminals, notebooks, and embedded systems. Personal computer (PC) systems, such as the International Business Machines (IBM) compatible PC systems, include desk top, floor standing, or portable versions. A typical PC system is a microcomputer that includes a processor, associated memory and control logic, and a number of peripheral devices that provide input and output for the system. Such peripheral devices often include display monitors, keyboards, mouse-type input devices, floppy and hard disk drives, CD-ROM drives, printers, network capability cards, terminal devices, modems, televisions, sound devices, voice recognition devices, electronic pen devices, and mass storage devices such as tape drives, CD-R drives, or DVDs. Other types of computer systems may includes some of these peripheral devices.

A computer server typically enables a number of other computer systems such as personal computer systems to retrieve and store data on data storage subsystems of the server.

As computer systems become more advanced, businesses and other organizations continue to utilize more computer systems in their operations. Correspondingly, a system administrator of an organization may be required to manage an increasing number of computer systems. Because of the large number and diverse use of today's computer systems in an organization, a system administrator may desire to manage the computer systems remotely. Managing multiple systems remotely may require that each computer system have a separate network line (e.g. telephone line) and/or separate remote access card. For every new system that is to be added, a new network line would also need to be added.

What is needed is a system that allows for the operable coupling of multiple computer system management circuits on a network to allow management of the multiple computer systems via a single network line.

It has been known to operably couple management circuits of devices of a server such as management circuits for hard disk drive pods, power supplies, and backplanes via a communications bus conforming to the I²C bus standard in a daisy chain configuration to a server. Such a system was sold in the POWER EDGE 4100 by the DELL COMPUTER CORP. Details of an example of a prior art system are found in Section A.

SUMMARY OF THE INVENTION

It has been discovered that operably coupling multiple management circuits, each from a different computer system, to a remote connector circuit to provide the data to a remote management system advantageously provides a system that can remotely manage a plurality of computer systems over a single network connection. In addition, a number of computer systems can be managed with one remote connector circuit and one network line.

In one aspect, the invention includes a system for enabling remote management of computer systems. The system includes a remote connector circuit. The remote connector circuit is operably coupled to a remote management system via a communications network. The system also includes a plurality of computer systems with each computer system including a management circuit and each management circuit obtaining operating information on at least one operating condition of its associated computer system. The system includes a communications bus. Each management circuit is operably coupled to the remote connector circuit via the communications bus. The operating information from each management circuit is provided to the remote connector circuit via the communications bus. The remote connector circuit provides the operating information from each management circuit to the remote management system via the communications network.

In another aspect of the present invention, a computer system includes a remote connector circuit. The remote connector circuit includes a network connector circuit for operably coupling the remote connector circuit to a remote management system via a communications network. The remote connector circuit also includes a communications bus connector circuit for operably coupling the remote connector circuit to a communications bus operably coupled to a plurality of computer system management circuits. Each management circuit obtains operating information on at least one operating condition of a computer system associated with the each management circuit. The remote connector circuit receives the operating information from the management circuits via the communications bus and provides the operating information to the remote management system via the communications network.

In another aspect of the present invention, a computer system includes a management circuit. The management circuit obtains operating information on at least one operating condition of the computer system. The management circuit includes communications bus circuitry for proving the operating information on a communications bus to a connector circuit to provide to a management system. The computer system also includes a first communications bus connector and a second communications bus connector. The first bus connector is capable of receiving a first communications bus cable coupled to an upstream computer system on the communications bus and the second communications bus connector is capable of receiving a second communications bus cable operably connected to a downstream computer system so as to operably couple the management circuit to the communications bus in a daisy chain configuration.

In another aspect of the present invention, a remote connector circuit includes a network connector circuit for operably coupling the remote connector circuit to a remote management system via a communications network. The remote connector circuit also includes a communications bus connector circuit for operably coupling the remote connector circuit to a communications bus operably coupled to a plurality of management circuits. Each management circuit obtains operating information on at least one operating condition of a computer system associated with each management circuit. The remote connector circuit receives the operating information from the management circuits via the communications bus and provides the operating information to the remote management system via the communications network.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of a mode for carrying out the invention. The description is intended to be illustrative of the invention and should not be taken to be limiting.

Figure 1:
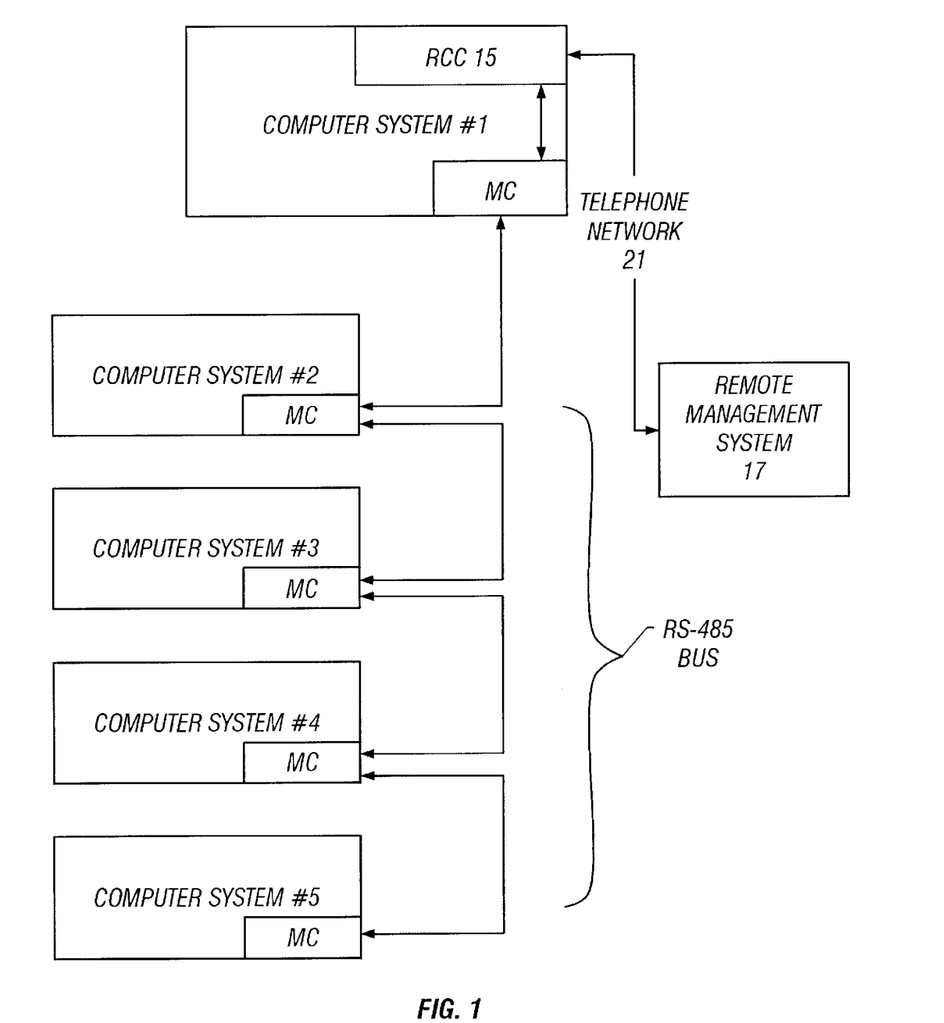
FIG. 1 shows a block diagram of a system for operably coupling multiple management circuits to a remote management system according to the present invention.

FIG. 1 shows a block diagram of a system for operably coupling multiple management circuits to a remote management system. A remote connector circuit (RCC) 15 mounted on a daughter card of computer system #1 obtains operating information on operating conditions from management circuits (designated as rectangular boxes labeled "MC") located in computer systems 1–5 via a daisy chained configured, half-duplex, serial communications bus conforming to the RS-485 standard. (See FIG. 4 for a block diagram of a management circuit). RCC 15 provides the obtained operating information to a remote management system 17 via telephone network 21, or with other systems, via a computer network such as a wide area network or local area network. Remote connector circuit 15 also receives operating commands such as reboot, power cycle, and shutdown operating system commands from remote management system 17 and provides those commands to the management circuits. The operating commands may be either individually addressed to each computer system management circuit or globally addressed to all computer system management circuits. A system administrator can monitor the operating conditions and issue operating commands to computer systems 1–5 remotely from remote management system 17. In one example, the remote management system is a personal computer system located in a system administrator's work area. In one embodiment, computer systems 1–5 are servers located on the same electronics rack or on adjacent electronics racks. For systems implementing the RS-485 communications bus with twisted pair wire, 31 management circuits can be operably coupled to the remote connector circuit 15 circuit via the RS-485 communications bus. Depending upon the configuration, a greater number of devices maybe operably coupled to the network. With other systems, communications busses conforming to other standards including other serial bus standards may be implemented to operably couple the management circuits to the remote connector circuit.

Figure 2:
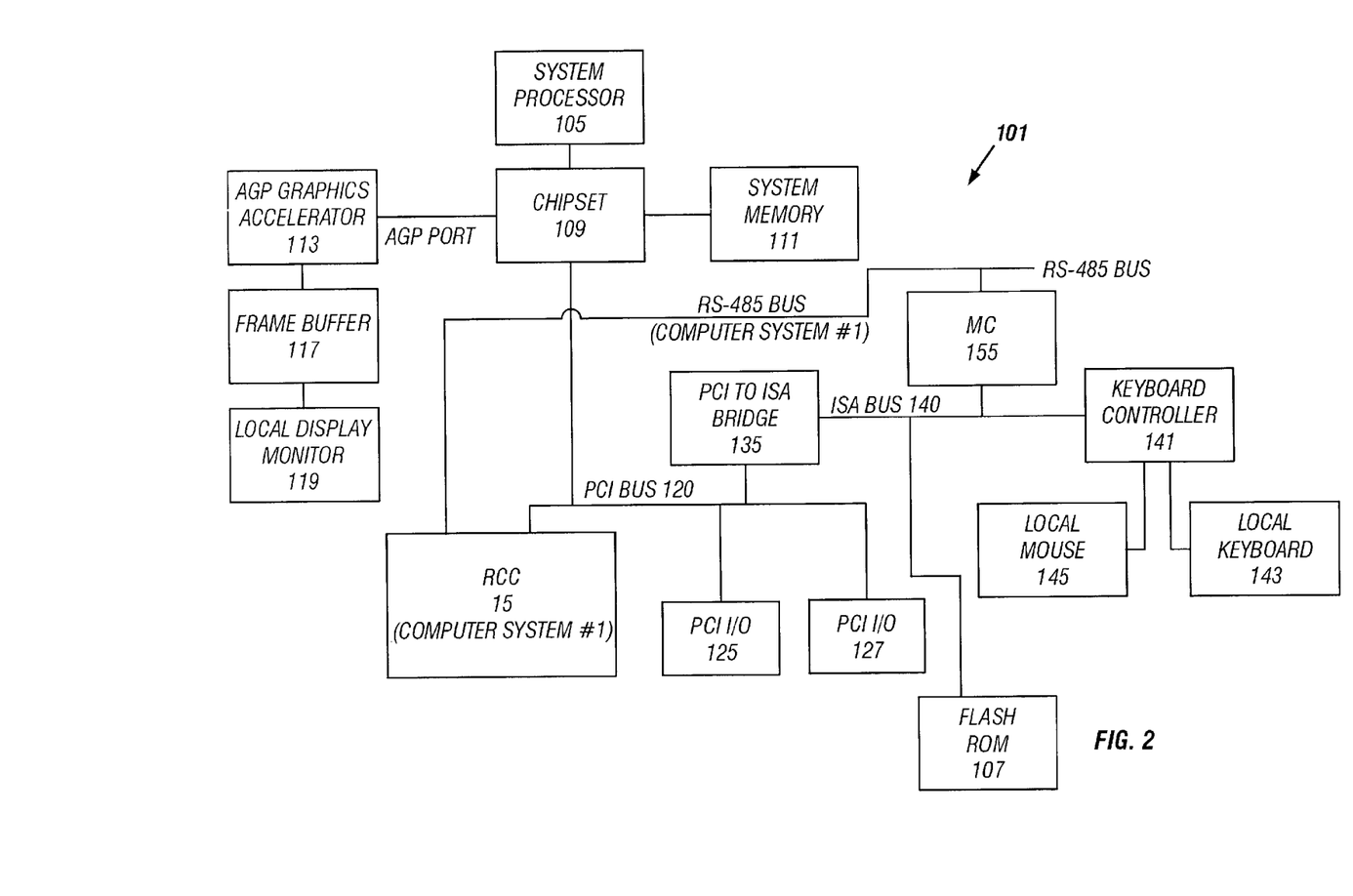
FIG. 2 shows a block diagram of a computer system according to the present invention.

FIG. 2 shows a block diagram of a computer system according to the present invention. Computer system 101 is a computer system server. However, other types of computer systems (such as personal computer systems) may be managed by the system described herein. One example of a computer system server is the POWER EDGE 2300 by the DELL COMPUTER CORP. Computer system 101 includes a system processor 105 and system memory 111. A description of an example of computer system 101 is found in the case entitled "Console Redirection For A Computer System," filed on Oct. 19, 1998, having a Ser. No. of 09/174,741, now allowed and having a common assignee, which is hereby incorporated by reference in its entirety.

Management circuit (MC) 155 is operably coupled to the system processor 105 via a computer bus 140 conforming to the Industry Standard Architecture (ISA) computer bus standard. Management circuit 155 monitors operating conditions of computer system 101 and enables a remote management system 17 (such as a personal computer) to receive operating information of those conditions via a remote connector circuit such as RCC 15 of computer system #1. Examples of operating conditions monitored by the management circuit may include environmental conditions such as the internal computer system temperature, operating temperatures of various circuits, and fan operating parameters such as fan speed(s) and fan operability. Other operating conditions monitored may include monitoring power supply parameters such as voltage levels, operability, power consumption, and back up power supply parameters. Another type of operating condition that may be monitored are security parameters such as chassis intrusion. A system management circuit may also receive operating information on other operating conditions such as from Power On Self-Test codes (POST codes) and other codes generated by the execution of a BIOS routine, including the logging of system memory errors, system bus parity errors, or predictive failure alerts for hard disk drives.

In some embodiments, a management circuit is also able to initiate computer system operations such as initiating a reboot of the computer system and initiating a power cycle of the computer system where the power is turned off and then on. Some management circuits are also able to initiate an orderly shutdown of the operating system. See FIG. 4 and accompanying discussion for firther information on a management circuit.

For the system shown in FIG. 1, only computer system #1 includes a remote connector circuit (RCC) 15. RCC 15 is operably coupled to the system processor 105 of computer system #1 via a computer bus 120, which in FIG. 2 conforms to the Peripheral Component Interconnect (PCI) standard. RCC 15 obtains operating information on operating conditions of computer system #1 from computer system #1's management circuit 155 via an internal RS-485 bus.

Figure 3:
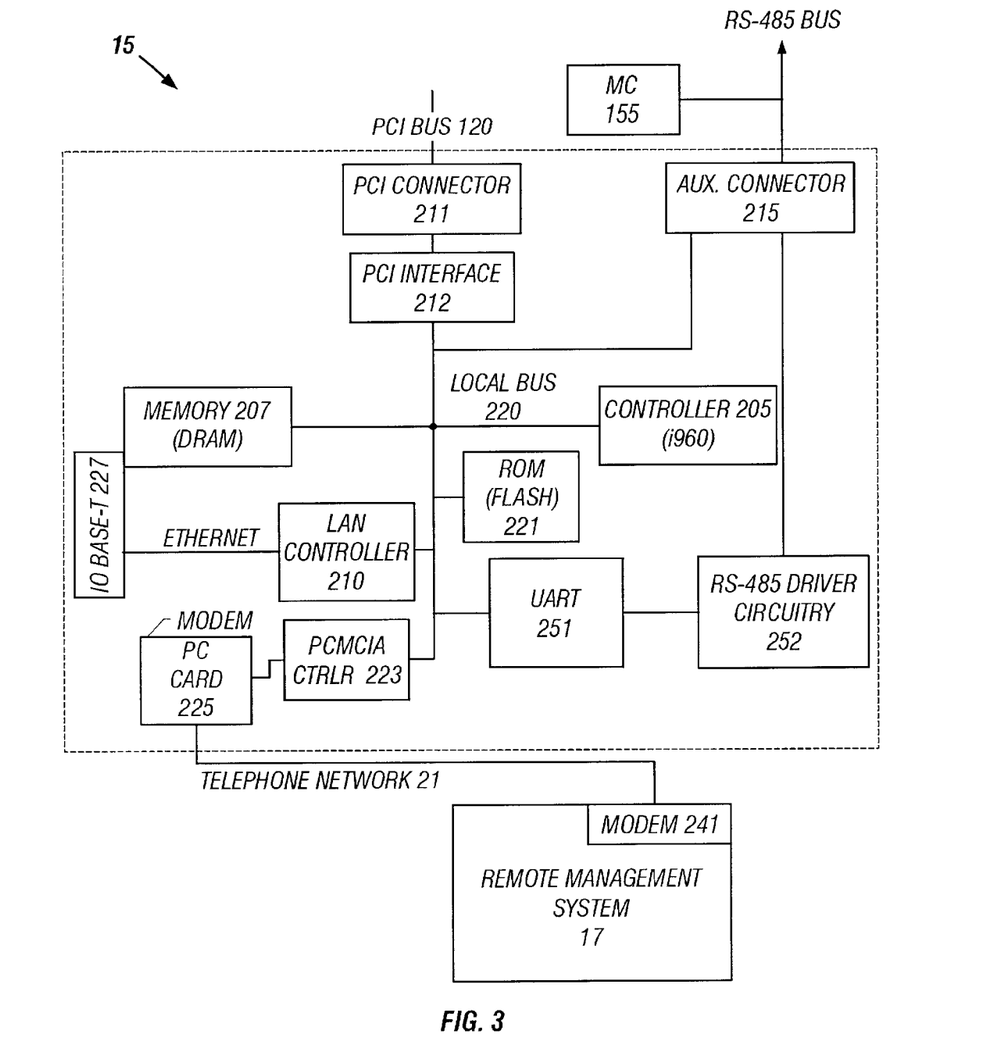
FIG. 3 shows a block diagram of a remote connector circuit according to the present invention.

FIG. 3 shows a block diagram of a remote connector circuit according to the present invention. RCC 15 is mounted in computer system #1 on a daughter card and receives and provides information to remote management system 17 via telephone network 21. RCC 15 includes circuitry (227 and 210) for operably coupling RCC 15 to other systems via a local area network such as an ethernet network. RCC 15 also includes a controller 223 compliant with the Personal Computer Memory Card International Association (PCMCIA) standard and PC card 225 (which includes modem circuitry) for operably coupling RCC 15 to a telephone network or other communications network such as a WAN. In FIG. 2, the remote connector circuit is capable of receiving and providing video data to the remote management system via telephone network 21 to enable remote console redirection of computer system #1. See the case entitled "Console Redirection for a Computer System", as referenced above.

Controller 205 of RCC 15 executes code stored in memory 207 and Flash ROM 221 to obtain operating information from monitoring circuit 155 and other monitoring circuits via the RS-485 communications bus. RCC 15 includes a Universal Asynchronous Receiver/Transmitter (UART) and RS-485 driver circuitry 252 to operably couple RCC 15 to the RS-485 bus via auxiliary connector 215. With other embodiments, some or all of the circuitry of the RCC circuitry may be integrated. An example of commands utilized by controller 205 in communicating with the management circuits on the RS-485 bus is found in a later section entitled "Exemplary Commands and Sequences."

Referring back to FIGS. 1 and 2, with some systems, a system administrator may also manage computer systems 1–5 via the local keyboard 141 and local display 119 of computer system #1. For these systems, RCC 15 is capable of providing operating information from the management circuits of computer systems 1–5 to computer system #1 and receiving operating commands from computer system #1 via PCI Bus 120 to provide to the management circuits.

Figure 4:
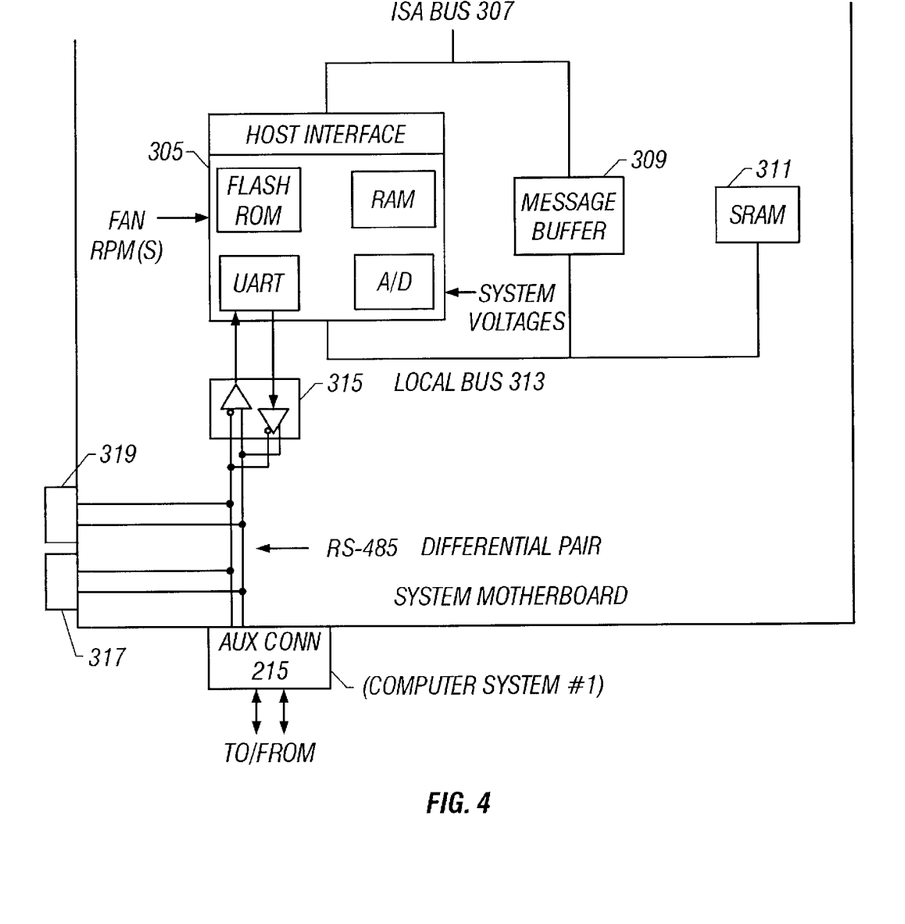
FIG. 4 shows a block diagram of a management circuit according to the present invention.

FIG. 4 shows a block diagram of a management circuit according to the present invention. The management circuit shown in FIG. 4 includes a controller 305 embedded on the system mother board of the computer system that includes the management circuit. In FIG. 4, controller 305 is operably coupled to a system processor via an ISA bus 307. The management circuit also includes a message buffer for storing information from the ISA bus 307 and an SRAM circuit operably coupled to controller 305 via local bus 313. SRAM 311 stores such information as event logs, POST codes, and system configuration information. Message buffer 309 and SRAM 311 are also embedded on the mother board. Controller 305 is operably coupled to the RS-485 communications bus via a conventional RS-485 transceiver 315 and differential pair wiring connected to RS-485 physical connectors 317 and 319 accessible from the back side of the computer system. The management circuit of computer system #1 is also operably coupled to RCC 15 via auxiliary connector 215 of the RCC daughter card. Connectors 317 and 319 enable a management circuit of a computer system to be coupled in a daisy chain configuration to the RS485 bus, wherein one of the connectors (317 or 319) receives a twisted pair cable from an upstream computer system, and the other connector receives a twisted pair cable from a downstream computer system. Controller 305 has access via an I/O port (not shown) to an identifier number (UID) that is unique to each computer system.

Controller 305 has integrated circuits of an ISA host interface, an flash ROM, a RAM, a UART (for RS-485 bus coupling), and an A/D converter for monitoring operating conditions of the computer system such as system voltages. Controller 305 also includes inputs for receiving operating information (such as fan parameters) via sideband signals. The integrated circuitry of controller 305 includes firmware code for receiving RS-485 commands via the RS-485 bus and for receiving, processing, storing, and providing the operating information of its associated computer system as well as initiating operations (e.g. reboot, power cycle, operating system shutdown) for its computer system. Also, controller 305 is capable of receiving battery back up power enabling the management circuit to provide data during power failures. An example of controller circuit 305 is an H8 controller offered by HITACHI.

Although controller 305 is operably coupled to a system processor of the computer system via the ISA bus 307, controller 305 operates independently of the computer system operating system thereby enabling the monitoring of operating conditions and the initiating of operations regardless and the whether the operating system is running or not. POST codes are provided to controller 305 via the ISA bus by the execution of BIOS.

Figure 5:
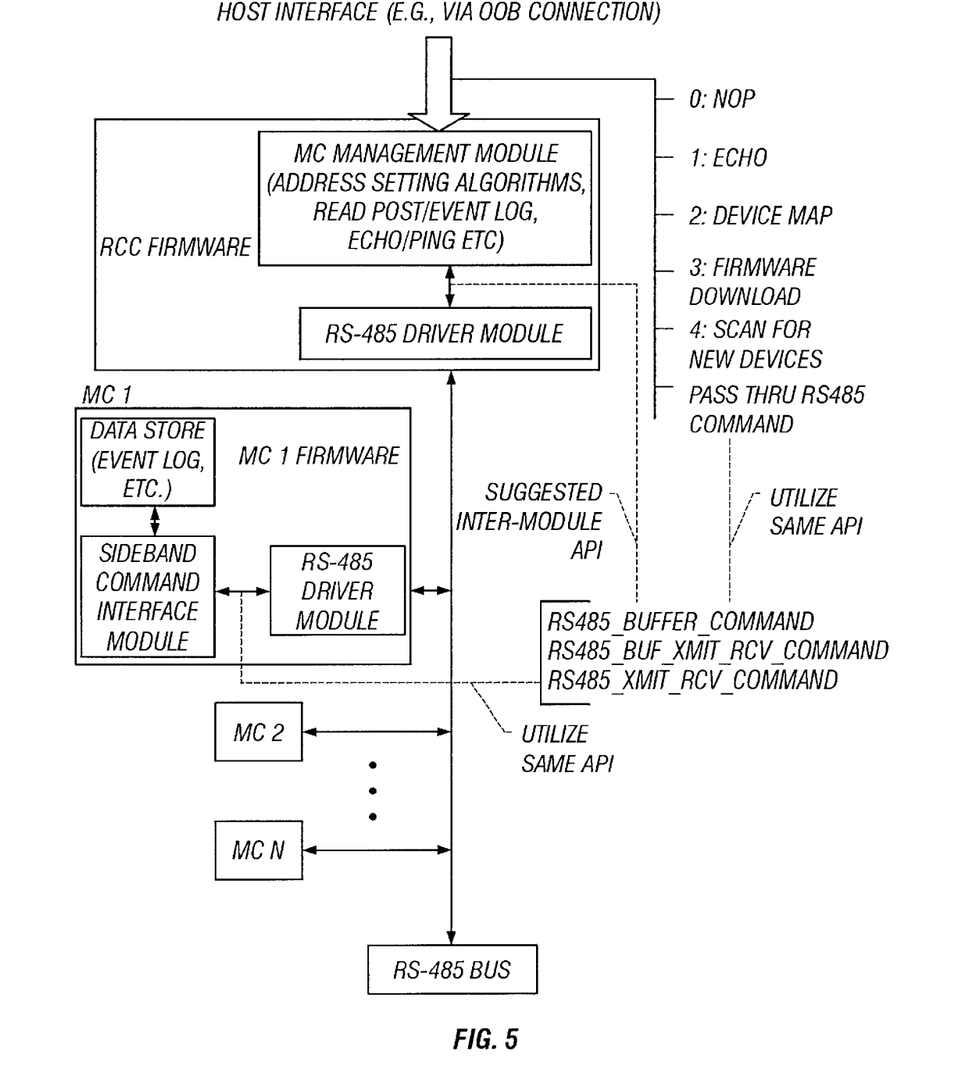
FIG. 5 shows a firmware architecture diagram of a system for operably coupling multiple management circuits to a remote management system according to the present invention.

FIG. 5 shows a firmware architecture diagram of a system for operably coupling multiple management circuits to a remote management system according to the present invention. Examples of the commands shown in FIG. 5 can be found in the later section entitled "Exemplary Commands and Sequences." Referring also to FIG. 1, RCC 15 communicates with the management circuits by polling each management circuit (MC). In the embodiment shown, only one management circuit accesses the RS-485 bus at a time. The RCC 15 enables its transmitter (located in the RS-485 driver circuitry 252) to send a command and then RCC 15 releases the RS-485 bus to wait for a response from the management circuit. The management circuits are enabled to transmit on command only. Reception by the management circuits is always enabled. With some systems, a Service Display Module (SDM) (not shown) may also act as a master, in addition to RCC 15, on the RS-485 bus, wherein the management circuits are slaves. An example of RS- 485 commands is found in the later section entitled "Exemplary Commands and Sequences."

With one embodiment, transmission on the RS-485 bus is performed with the UARTs of the management circuits (integrated in controller 305) and the RCC (UART 251) set at 38400 baud with 8 data bits, a forced parity bit, and one stop bit. When the master (the RCC) sends out the address byte (the first byte of a transmission sequence), the parity bit is forced to one. When the master sends out all other data bytes, the parity bit is forced to zero. This allows a management circuit controller 305 to use its multiprocessor receive interrupt function. If a management circuit receives its address, it will listen to the whole command and respond accordingly. Otherwise, the controller may ignore the transmission.

During the initial startup of the communications system, the RCC 15 assigns a bus address to each management circuit of the system. In the embodiment described, the assignment of bus addresses is accomplished by a collision detection/back off/retry scheme wherein the time to retry is based an identifier number (UID) that is unique to each computer system. During an address assignment routine, RCC 15 sends out a return UID command on the RS-485 bus to a class address for all management circuits coupled to the RS-485 bus. In response, the management circuits respond with their respective UIDs. The management circuits listen to their own transmissions. If there is a collision, the data sent by a management circuit will not match the data received. If a collision is detected, a management circuit will drop off the bus for a period of 4 character times +1 character time (287 microseconds at 38400 Baud) times the least significant bit of the UID and then initiate a retry to send the response. If the management circuit receives a character during that wait it will abort the retry process and wait for the next command. This allows only one management circuit to answer the RCC 15 at a time. After a correct (valid checksum) return UID message is received by RCC 15 from one of the management circuits, RCC 15 sets a new address on the responding management circuit by sending a set address command. The RCC 15 continues to send out return UID commands at the class address until no management circuit responds indicating that all of the management circuits have been assigned an address. The RCC 15 obtains data from each management circuit by polling the management circuits utilizing the newly assigned addresses.

Providing the system wherein the initial assignment of addresses is dependent upon a unique identifier enables multiple management circuits to be coupled to the system without a system administrator having to set switches or assign addresses to each management circuit.

Enabling a daisy chain configuration of the RS-485 bus allows for an additional computer system to be physically installed on the system with a single, twisted-pair cable.

Management circuits of other devices may be operably coupled to the RS-485 bus (or a communications bus conforming to another standard) and be remotely managed by the remote management system. For example, a back-up power supply (e.g. an uninterruptable power supply) that supplies backup power to the servers may include a management circuit that is operably coupled to the RS-485, bus thereby enabling the remote management of the back-up power supply.

In addition, the remote management system may provide firmware updates to the management circuits via RCC 15 and the RS-485 communications bus.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Exemplary Commands and Sequences

The following are examples of command formats by the RCC Controller and command and response sequences by the RCC controller and management circuits in communicating on the RS-485 communications bus. These examples are presented to further illustrate one embodiment of the invention and should not be taken to be limiting of the invention.

Default Addresses

Address 0x00 is reserved.
Broadcast address will be 0x01.
RC will default to a class address of 0x02h.
Address 0x03 – 0x0f reserved for multiple RCCs
SDM will default to a class address of 0x10h.
Addresses 0x11 – 0x1f reserved for multiple SDMs
MC will default to a class address of 0x20h.
Address 0x21 – 0x7f reserved for slave address assignment Command format All commands will have the following format:
    Byte 0 = Address of slave (parity bit = 1)
    Byte 1 = Address of master
    Byte 2 = Command Handle (0x00 – 0x7f) (NOTE: 0x80 – 0xff = Dell Reserved)
    Byte 3 = Byte count of Command Data Bytes
    Byte 4 – n = Command Data bytes
    Byte n + 1 = Checksum (2s complement of Bytes 0 – n)
All responses will have the following format:
    Byte 0 = Address of master (parity bit = 1)
    Byte 1 = Address of slave
    Byte 2 = Command Handle (0x00 – 0x7f) (NOTE: 0x80 – 0xff = Reserved)
    Byte 3 = Byte count of Response Data Bytes
    Byte 4 – n = Response Data bytes
    Byte n + 1 = Checksum (2s complement of Bytes 0 – n)
The following function prototype describes the above procedure:
    u8 RS485_XMIT_RECV_COMMAND (u8 SlaveAddresss, u8 XmitByteCourt,
    u8 *pRecvByteCount, u8 *pXmitRecvDataBuf)
    {
    return MC_STATUS_CMD_SUCCESS;
    }

Host Out of Band (OOB) Commands

0x00  NOP
    0x01  ECHO
    0x02  DEVICE_MAP
    0x03  SCAN_FOR_NEW_DEVICES RS-485 Commands     Use: R5485_XMIT_RECV_COMMAND or
RS485_BUF_XMIT_RECV_COMMAND.
    0x50  RETURN RS485 UID
    0x51  SET RS485 ADDRESS
    0x00: NOP
        Cmd:
        Byte 0 = Command Byte = NOP
        Response:
        Byte 0 = Command Completion Status
        Byte 1 = Command Byte = NOP
    0x01: ECHO_DATA
        Cmd:
        Byte 0 = Command Byte = ECHO_DATA

```
    Byte 1 = NumEchoDataBytes (1 - 0x1f)
    Byte 2 = ECHO_DATA[0]
    Byte 3 = ECHO_DATA[1]
        ...
    Byte N = ECHO_DATA[NumEchoDataBytes - 1]
    Response:
    Byte 0 = Command Completion Status
    Byte 1 = NumEchoDataBytesReturned(1 - 0x1f)
    Byte 2 = ECHO_DATA[0]
    Byte 3 = ECHO_DATA[1]
        ...
    Byte N = ECHO_DATA[NumEchoDataBytesReturned - 1]
0x02: DEVICE_MAP
    This returns the current active device map maintained by the RCC.
It also contains information on how the devices are monitored.
    MonitorType definitions:
        #define MONITOR_TYPE_POLL      (0) /* monitor every
poll cycle */
        #define MONITOR_TYPE_ALERT     (1) /* monitor on alert
only */
        #define MONITOR_TYPE_COMBO     (2) /* monitor if alert
does not occur within poll cycle after last alert */
        #define MONITOR_TYPE_HOST      (3) /* monitor is
performed under host control */
    Cmd:
    Byte 0 = Command Byte = DEVICE_MAP
    Byte 1 = InitiatorIndex [TBD]
    Byte 2 = Action
    #define DM_READ_MAP                     (0)
    #define DM_WRITE_MONITOR_TYPE           (1)
    (If Action = DM_READ_MAP)
    Byte 3 = MapIndex to start from
    Byte 4 = NumDevices to retrieve from map
    (If Action = DM_WRITE_MONITOR_TYPE)
    Byte 3 = MapIndex to start from
    Byte 4 = NumDevices to setup
    Byte 5 = MonitorType[for MapIndex]
    Byte 6 = PollCycle (in NumSeconds, 0 for
MONITOR_TYPE_ALERT)
    Byte 7 = MonitorType[for MapIndex + 1]
    Byte 8 = PollCycle (in NumSeconds, 0 for
MONITOR_TYPE_ALERT)
        ...
    Byte N = MonitorType[MapIndex + NumDevices - 1]
    Byte N + 1 = PollCycle (in NumSeconds, 0 for
MONITOR_TYPE_ALERT)
    Response:
    Byte 0 = Command Completion Status
    Byte 1 = Num Devices in returned map
    Byte 2 = Map[InitiatorIndex, MapIndex + 0].DeviceIndex
    Byte 3 = Map[InitiatorIndex, MapIndex + 0].Major Type
    Byte 4 = Map[InitiatorIndex, MapIndex + 0].Minor Type
    Byte 5 = Map[InitiatorIndex, MapIndex + 0].Major Rev Level
    Byte 6 = Map[InitiatorIndex, MapIndex + 0].Minor Rev Level
    Byte 7 = Map[InitiatorIndex, MapIndex + 0].Rom Rev Level
    Byte 8 = Map[InitiatorIndex, MapIndex + 0].RS485 Address
    Byte 9 = Map[InitiatorIndex, MapIndex + 0].Status /* Valid, Lost
Contact */
    Byte 10 = Map[InitiatorIndex, MapIndex + 0].MonitorType
    Byte 11 = Map[InitiatorIndex, MapIndex + 0].PollCycle
    Byte 12-19 = Map[InitiatorIndex, MapIndex+ 0].UniqueID [Byte
0 = LSB]
        ...
    Byte N = Map[InitiatorIndex, MapIndex + (NumDevices -
1)].DeviceIndex
    Byte N + 1 = Map[InitiatorIndex, MapIndex + (NumDevices -
1)].Major Type
    Byte N + 2 = Map[InitiatorIndex,.MapIndex + (NumDevices -
1)].Minor Type
    Byte N + 3 = Map[InitiatorIndex, MapIndex + (NumDevices -
1)].Major Rev Level
    Byte N + 4 = Map[InitiatorIndex, MapIndex + (NumDevices -
1)].Minor Rev Level
    Byte N + 5 = Map[InitiatorIndex, MapIndex + (NumDevices -
1)].Rom Rev Level
    Byte N + 6 = Map[InitiatorIndex, MapIndex + (NumDevices -
1)].RS485 Address
    Byte N + 7 = Map[InitiatorIndex, MapIndex + (NumDevices -
1)].Status
```

-continued

```
            Byte N + 8 = Map[InitiatorIndex, MapIndex + (NumDevices -
        1)].MonitorType
            Byte N + 9 = Map[InitiatorIndex, MapIndex + (NumDevices -
        1)].PollCycle
            Byte N + 10 - N + 17 = Map[InitiatorIndex, MapIndex +
        0].UniqueID [Byte 0 = LSB]
    0x03: SCAN_FOR_NEW_DEVICES
            Scans for new devices on all buses that MC supports viz. I2C and
        sideband bus.
            Cmd:
            Byte 0 = Command Byte = SCAN_FOR_NEW_DEVICES
            Byte 1 = DeviceIndex
            Byte 2 = Action
            #define READ_SCAN_STATUS              (0)
            #define INITIATE_CANCEL_SCAN          (1)
        [OPT]
            #define INITIATE_SCAN_BLOCKING        (2) /*
        response not generated until scan complete */
            #define INITIATE_SCAN_NONBLOCKING     (3) /*
        response generated immediately after which scan starts. Use
        READ_SCAN_STATE to get progress reports */
            Response:
            On all Actions.
            Byte 0 = MC Command Completion Status
            Byte 1 = ScanProgressStatus
            #define SFND_GENERIC_ERROR            (-1)
            #define_SFND_NO_SCAN_W_PROGRESS
            (0)
            #define SFND_SCAN_IN_PROGRESS         (1)
            #define SFND_SCAN_COMPLETE            (2)
            #define SFND_SCAN_CANCELLED           (3)
            Byte 2 = Total devices currently found by scan
    0x50: GET_RS485_UID
            Cmd:
            Byte 0 = Command Byte = GET_RS485_UID
            Response:
            Byte 0 - 7 = MC UID (Byte 0 = LSB)
    0x51: SET_RS485_ADDRESS
            Cmd:
            Byte 0 = Command Byte = SET_R5485_ADDRESS
            Byte 1 = New Address
            Byte 2 = Master Address
            Byte 3-10 = UID (Byte 3 = LSB)
            Response:
            Byte 0 = Address of slave device (if successful then should be
        equal to NewAddress)
```

Command and Response Sequences Examples

I. MC Discovery Process
Send get MC UID to MC class address
Command:
Byte 0 = Address of slave (parity bit = 1) = 0x20
Byte 1 = Address of master = 0x01
Byte 2 = Command Handle (0x00 - 0x7f) = 0x01
Byte 3 = Byte count of Command Data Bytes = 0x01
Byte 4 = Command Data Byte = GET_RS485_UID = 0x50
Byte 5 = Checksum (2s complement of Bytes 0–4) = 0x8d
Response:
Byte 0 = Address of master (parity bit = 1) = 0x01
Byte 1 = Address of slave = 0x20
Byte 2 = Command Handle (0x01 - 0x7f) = 0x01
Byte 3 = Byte count of Response Data Bytes = 0x08
Byte 4 = MC UID0 (LSB) = 0x12
Byte 5 = MC UID1 = 0x34
Byte 6 = MC UID2 = 0x56
Byte 7 = MC UID3 = 0x78
Byte 8 = MC UID4 = 0x9a
Byte 9 = MC UID5 = 0xbc
Byte 10 = MC UID6 = 0xde
Byte 11 = MC UID7 (MSB) = 0xf0
Byte 12 = Checksum (2s complement of Bytes 0–11) = 0x9e
Function call would be:
XmitRecvBuffer[0] = GET_RS485_UID;
XmitRecvBuffer[1] = Checksum;
If(RS485_XMIT_RECV_COMMAND (0x20, 1, &RecievedBytes,
XmitRecvBuffer) != MC_STATUS_CMD_SUCCESS)
{
    printf("Failed\n");
}

-continued

```
        else
        {
            printf("Success Data in buffer"),
            DumpBuffer(RecievedBytes, XmitRecvBuffer);
        }
        Send Set RS485 Address to MC
        Command:
        Byte 0 = Address of slave (parity bit = 1) = 0x20
        Byte 1 = Address of master = 0x01
        Byte 2 = Command Handle (0x01 − 0x7f) = 0x02
        Byte 3 = Byte count of Command Data Bytes = 0x0b
        Byte 4 = Command Data Byte = SET_RS485_ADDRESS = 0x51
        Byte 5 = New Address = 0x21
        Byte 6 = Master Address = 0x01
        Byte 7 = MC UID0 (LSB) = 0x12
        Byte 8 = MC UID1 = 0x34
        Byte 9 = MC UID2 = 0x56
        Byte 10 = MC UID3 = 0x78
        Byte 11 = MC UID4 = 0x9a
        Byte 12 = MC UID5 = 0xbc
        Byte 13 = MC UID6 = 0xde
        Byte 14 = MC UID7 = 0xf0
        Byte 15 = Checksum (2s complement of Bytes 0 − 14) = 0x63
        Response:
        Byte 0 = Address of master (parity bit = 1) = 0x01
        Byte 1 = Address of slave = 0x20
        Byte 2 = Command Handle (0x01 − 0x7f) = 0x02
        Byte 3 = Byte count of Response Data Bytes = 0x01
        Byte 4 = NewSlaveAddress = 0x21
        Byte 5 = Checksum (2s complement of Bytes 0–4) = 0xbb
        Function call would be:
        XmitRecvBuffer[0] = SBT_R5485_ADDRESS;
        XmitRecvBuffer[1] = NewAddress;
        XmitRecvBuffer[2] = MasterAddress;
        XmitRecvBuffer[3] = MC UID0;
        ...
        XmitRecvBuffer[10] = MC UID7;
        XmitRecvBuffer[11] = Checksum;
            If (R5485_XMIT_RECV_COMMAND (0x20, 1, &ReceivedBytes,
        XmitRecvBuffer) != MC_STATUS_CMD_SUCCESS)
        {
            printf("Failed\n");
        }
        else
        {
            printf("Success Data in buffer");
            DumpBuffer(RecievedBytes,XmitRecvBuffer);
        }
II.  Echo Command to MC
     Send Echo Command to MC
     Command:
     Byte 0 = Address of slave (parity bit = 1) = 0x21
     Byte 1 = Address of master = 0x01
     Byte 2 = Command Handle (0x01 − 9x7f) = 0x03
     Byte 3 = Byte count of Command Data Bytes = 0x06
     Byte 4 = Command Byte = ECHO_DATA = 0x01
     Byte 5 = NumEchoDataBytes (1 − 0x1f) = 0x04
     Byte 6 = ECHO_DATA[0] = 0x11
     Byte 7 = ECHO_DATA[1] = 0x22
     Byte 8 = ECHO_DATA[2] = 0x33
     Byte 9 = ECHO_DATA[3] = 0x44
     Byte 10 = Checksum (2s complement.of Bytes 0–13) = 0x26
     ..
     Response:
     Byte 0 = Address of master (parity bit = 1) = 0x01
     Byte 1 = Address of slave = 0x21
     Byte 2 = Command Handle (0x01 − 0x7f) = 0x03
     Byte 3 = Byte count of Response Data Bytes = 0x04
     Byte 4 = MC Command Completion Status = STATUS CMD_SUCCESS = 0x00
     Byte 5 = NumEchoDataBytesReturned = 0x04
     Byte 6 = ECHO_DATA[0] = 0x11
     Byte 7 = ECHO_DATA[1] = 0x22
     Byte 8 = ECHO_DATA[2] = 0x33
     Byte 9 = ECHO_DATA[3] = 0x44
     Byte 10 = Checksum (2s complement of Bytes 0–19) = 0x29
III. Read MC Device Log
     Send DEVICE_LOG
     Command:
     Byte 0 = Address of slave (parity bit = 1) = 0x21
```

-continued

```
Byte 1 = Address of master = 0x01
Byte 2 = Command Handle (0x01 - 0x7f) = 0x04
Byte 3 = Byte count of Command Data Bytes = 0x04
Byte 4 = Command Byte = DEVICE_LOG = 0x09
Byte 5 = Action = DL_READ_EVENT_LOG = 0x08
Byte 6 = LogIndexStart LSB = 0x00
Byte 7 = LogIndexStart MSB - 0x00
Byte 8 = Checksum (2s complement of Bytes 0–19) = 0xc5
Response:
Byte 0 = Address of master (parity bit = 1) = 0x01
Byte 1 = Address of slave = 0x21
Byte 2 = Command Handle (0x01 - 0x7f) = 0x04
Byte 3 = Byte count of Response Data Bytes
Byte 4 = MC Command Completion Status = STATUS_CMD_SUCCESS = 0x00
Byte 5 = # Logs Returned M
Byte 6 = Type (Host log types currently undefined)
Byte 7 = AlertSeventy
Byte 8 = Length N
Byte 9 = Error Log Body[0..N]
...
Byte N = Checksum (2s complement of Bytes 0 - (N-1))
Note:
    RCC must decode timestamps of logs using value returned.
Definitions
Completion Status is defined as follows:
    #define MC_STATUS_CMD_UNSUCCESSFUL          (-1)
    #define MC_STATUS_CMD_SUCCESS               (0)
    #define MC_STATUS_CMD_NOT_IMPLEMENTED       (1)
    #define MC_STATUS_CMD_BAD                   (2)
    #define MC_STATUS_CMD_TIMEOUT               (3)
    #define MC_STATUS_CMD_CANCELLED             (4) /* Host
initiated canceled command */
    #define MC_STATUS_CMD_ABORT                 (5) /* MC
initiated canceled command */
    #define MC_STATUS_CMD_PENDING               (6)
    #define MC_STATUS_CMD_NO_SUCH_DEVICE        (7)
    #define MC_STATUS_CMD_DEVICE_BUSY           (8)
    #define MC_STATUS_CMD_DEVICE_BAD            (9)
    #define MC_STATUS_CMD_DEVICE._3SPURIOUS_INTR (10)
    #define MC_STATUS_CMD_RESOURCE_LOCKED       (11)
    #define MC_STATUS_CMD_ALERT_PENDING         (0x80) /* this
is also in SCI event bit of the EC_SC Status register */
    ??#define MC_STATUS_CMD_SCI_OCCURED         (9)
    ??#define MC_STATUS_CMD_SMI_OCCURED         (20)
```

Section A

The following describes the data protocol used for inter-agent communication over a System Management Bus (SMB) hardware. The SMB protocol corresponds to the Data Link Layer of the ISO OSI reference model (see Tanenbaum). The physical layer is assumed to be I²C. The I²C interface protocol is described in detail in manuals by the PHILLIPS CORP.

The SMB protocol is based on a single SMB host servicing many SMB agents. The SMB host will poll the agents for service requests under normal operations. Several of the agents require the need to interrupt the normal mode by initiating communications. This is accomplished by allowing the SMB agents to become I²C bus masters. Thus, the SMB bus has a single SMB master and multiple I²C masters.

The data structures used for SMB communications are made up of four basic types of information. These are: stipulated, fixed, dynamic, and control. Where information is placed depends on its scope. Stipulated data is known at compile time. Fixed data is obtained at power-up or (re-) configuration time. Dynamic and control data changes throughout operations.

The SMB agents are divided into device classes with possible multiple instance of each class. The class address is used by all agents of said class until a sub address within said class can be assigned to each agent. This allows software hot plug ability of additional devices onto the SMB bus and software being able to auto-configure each additional device.

The SMB protocol supports a checksum for detecting transmission errors. The checksum consists of all bytes sent by the I²C master including the I²C slave address with the read/write bit. It is a simple eight bit sum. The actual sum is sent for the checksum, i.e. the checksum sent is equal to the mod eight sum of the message with address byte included.

SMB Functions include 1) Inter Agent Communications; 2) Error Reporting; 3) Diagnostics aid; 4) Agent Control; 5) Agent Firmware updates; and 6) Status Updates.

The addressing of individual devices on the I²C bus is controlled by the first seven bits sent by the current master. The eighth bit is used to tell the slave device if a read or write request is being made. There are many addresses pre-defined within the 128 byte address space for use with specific devices. These addresses should be avoided to allow any standard device to be added in the future. Several addresses are not allowed for I²C operations (see PHILLIPS 80C51 Based 8-Bit Microcontrollers I²C-bus specification p.142).

The address of individual agents is accomplished by using 'squawk' addresses for groups of devices. This is used to indicate that at least one device needs to be assigned a dedicated address. The SMB master device will issue a Get_Slave_Identity command at the squawk address which needs service. All devices at this squawk address will accept this message and try to reply with their identity and their Unique ID (UID) or whim number for old squawk devices.

The SMB master then issues a Set_Slave_Address with the proposed new address and the UID it had received. Assuming a valid UID was received, at most one device will be assigned this new address. The SMB master will then verify the device has moved to the new address by issuing a Get_Slave_Identity to the new address. The returned UID is verified before the address assignment is permanent. The SMB master then continues working on the squawk address until no devices answer. The individual agents at the same squawk address will delay replying for a number of requests based the difference between their own UID and the UID received during the Set_Slave_Address. This will reduce the number of devices responding to the squawk and increase the likelihood of a valid UID being received and transmitted to the SMB master during the squawk search.

All SMB slave agents will operate at any assigned address. The Set_Slave_Address command will also inform the SMB agents who the current master should be. If the new address and the new master address are not the same, the agent will not be an SMB master. The reverse is not true. An agent will only become SMB master when it has the ability. This method allows the ESM or other control agent to be master while the other device is missing, and then become a slave when a new master is present.

What is claimed is:

1. A system for enabling remote management of computer systems comprising:
   a remote connector circuit, the remote connector circuit operably coupled to a remote management system via a communications network;
   a plurality of computer systems, each computer system including a management circuit, each management circuit obtaining operating information on at least one operating condition of its associated computer system;
   a communications bus, each management circuit operably coupled to the remote connector circuit via the communications bus, wherein the operating information from each management circuit is provided to the remote connector circuit via the communications bus, the remote connector circuit providing the operating information from each management circuit to the remote management system via the communications network;
   wherein the management circuits are operably coupled to the communications bus in a daisy chain configuration; and
   wherein each management circuit operates independently of an operating system of its associated computer system.

2. The system of claim 1 wherein the communications bus includes a serial data bus.

3. The system of claim 2 wherein:
   the communications bus substantially conforms to a RS-485 standard.

4. The system of claim 1 wherein the at least one operating condition includes an environmental condition of the associated computer system.

5. The system of claim 4 wherein the environmental condition includes an temperature condition of the associated computer system.

6. The system of claim 4 wherein the environmental condition includes a fan operating parameter of the associated computer system.

7. The system of claim 4 wherein the at least one operating condition includes a power supply parameter of the associated computer system.

8. The system of claim 1 wherein each management circuit maintains an event log of error conditions related to the at least one operating condition, wherein the event log is provided to the remote connector circuit via the communications bus.

9. The system of claim 1 wherein each management circuit obtains the operating information from codes generated by the execution of a BIOS routine of its associated computer system.

10. The system of claim 1 wherein each management circuit initiates a computer system operation on its associated computer system in response to receiving a management system generated operating command via the communications bus.

11. The system of claim 10 wherein the computer system operation is a reboot of the associated computer system and the management system generated operating command is a reboot command.

12. The system of claim 10 wherein the computer system operation is a power cycle of the associated computer system and the management system generated operating command is a power cycle command.

13. The system of claim 10 wherein the computer system operation is a shut down of an operating system of the associated computer system and the management system generated operating command is an operating system shutdown command.

14. The system of claim 1 wherein each management circuit includes a controller embedded on a motherboard of its associated computer system.

15. The system of claim 1 wherein each computer system is a server.

16. The system of claim 1 wherein a computer system of the plurality of computer systems includes the remote connector circuit.

17. The system of claim 1 wherein the remote connector circuit polls each management circuit via the communications bus to obtain the operating information from each management circuit.

18. The system of claim 1 wherein a communications bus address of each management circuit is dependent upon an identifier number unique to each management circuit.

19. The system of claim 1 wherein the remote connector circuit provides management system generated firmware to the management circuits via the communications bus.

20. The computer system of claim 1, wherein the remote connector circuit assigns a communications bus address to each management circuit operably coupled to the communications bus.

21. A computer system comprising:
   a management circuit, the management circuit obtaining operating information on at least one operating condition of the computer system, the management circuit including communications bus circuitry for proving the operating information on a communications bus to a connector circuit to provide to a management system;
   a first communications bus connector;
   a second communications bus connector;
   wherein the first bus connector is capable of receiving a first communications bus cable coupled to an upstream computer system on the communications bus and the second communications bus connector is capable of receiving a second communications bus cable operably connected to a downstream computer system so as to operably couple the management circuit to the communications bus in a daisy chain configuration; and
   wherein the management circuit operates independently of an operating system of the computer system.

22. The computer system of claim 21 wherein the communications bus includes a serial data bus.

23. The computer system of claim 22 wherein:
the communications bus substantially conforms to a RS-485 standard.

24. The computer system of claim 21 wherein the at least one operating condition includes an environmental condition of the computer system.

25. The computer system of claim 24 wherein the environmental condition includes a fan operating parameter of the associated computer system.

26. The computer system of claim 21 wherein the at least one operating condition includes a power supply parameter of the associated computer system.

27. The computer system of claim 21 wherein the at least one operating condition includes a security parameter of the associated computer system.

28. The computer system of claim 21 further comprising:
a motherboard, wherein the management circuit includes a controller embedded on the motherboard.

29. The computer system of claim 21 wherein a communications bus address of the management circuit is dependent upon an identifier number unique to the management circuit.

30. The computer system of claim 21 wherein the management circuit is electrically coupled to receive power from a battery power source.

31. The computer system of claim 21 wherein the management circuit maintains an event log of error conditions related to the at least one operating condition, wherein the event log is provided to the remote connector circuit via the communications bus.

32. The computer system of claim 21 wherein the management circuit obtains the operating information from codes generated by the execution of a BIOS routine of its associated computer system.

33. The computer system of claim 21 wherein the management circuit initiates a computer system operation on the computer system in response to receiving a management system generated operating command via the communications bus.

34. The computer system of claim 33 wherein the computer system operation is a reboot of the computer system and the management system generated operating command is a reboot command.

35. The computer system of claim 33 wherein the computer system operation is a power cycle of the computer system and the management system generated operating command is a power cycle command.

36. The computer system of claim 33 wherein the computer system operation is a shut down of an operating system of the computer system and the management system generated operating command is an operating system shutdown command.

37. A computer system comprising:
a remote connector circuit comprising:
a network connector circuit for operably coupling the remote connector circuit to a remote management system via a communications network;
communications bus connector circuit for operably coupling the remote connector circuit to a communications bus operably coupled to a plurality of computer system management circuits, each management circuit obtaining operating information on at least one operating condition of a computer system associated with the each management circuit;
a controller; and
a memory storing code wherein the controller, executing the code, assigns a communications bus address to each management circuit operably coupled to the communications bus, wherein the bus address assigned to each management circuit is dependent upon an identifier number unique to each management circuit, wherein the bus addresses are assigned in a collision detection/back off/retry scheme wherein an amount of time before retry for each management circuit is based upon the identifier number unique to each management circuit;
wherein the remote connector circuit receives the operating information from the management circuits via the communications bus and provides the operating information to the remote management system via the communications network.

38. The computer system of claim 37 further comprising:
a daughter card, the remote connector circuit being implemented on the daughter card.

39. The computer system of claim 38 wherein the daughter card further comprises:
an auxiliary connector, the communications bus connector circuit operably coupled to the communications bus via the auxiliary connector.

40. The computer system of claim 37 wherein:
the computer bus connector circuit is substantially compliant to a RS-485 standard.

41. The computer system of claim 37 wherein the network connector circuit includes a modem circuit.

42. The computer system of claim 41 wherein the communications network includes a telephone network.

43. The computer system of claim 42 wherein the communications network is a local area network (LAN) conforming to a LAN standard, wherein the remote connector circuit is compliant to the LAN standard.

44. The computer system of claim 37 wherein the at least one operating condition includes an environmental condition.

45. The computer system of claim 37 wherein the remote connector circuit includes:
a controller;
a memory storing code, wherein the controller executes the code to poll the management circuits on the communications bus to receive the operating information.

46. The computer system of claim 45 wherein the controller, executing the code, assigns a communications bus address to each management circuit operably coupled to the communications bus.

47. The computer system of claim 37 wherein the remote connector circuit is operably coupled to the system processor via a computer bus.

48. The computer system of claim 37 wherein the remote connector circuit is capable of providing the operating information to a system processor of the computer system via the computer bus.

49. The computer system of claim 37 further comprising:
a management circuit operably coupled to the communications bus, the management circuit obtaining operating information on at least operating condition of the computer system, the management circuit providing the operating information to the remote connector circuit via the computer bus.

50. The computer system of claim 49 wherein the management circuit includes a controller embedded on a motherboard of the computer system.

51. The computer system of claim 37 wherein remote connector circuit provides operating commands received from the management system to the management circuits for the management circuits to initiate computer system operations in response to the operating commands.

52. The computer system of claim 37 wherein the remote connector circuit polls each management circuit via the communications bus to obtain the at least one operating condition from each management circuit.

53. A remote connector circuit comprising:

a network connector circuit for operably coupling the remote connector circuit to a remote management system via a communications network;

communications bus connector circuit for operably coupling the remote connector circuit to a communications bus operably coupled to a plurality of management circuits, each management circuit obtaining operating information on at least one operating condition of a computer system associated with each management circuit;

a controller;

a memory storing code wherein the controller, executing the code, assigns a communications bus address to each management circuit operably coupled to the communications bus, wherein the bus address assigned to each management circuit is dependent upon an identifier number unique to each management circuit, wherein the bus addresses are assigned in a collision detection/back off/retry scheme wherein an amount of time before retry for each management circuit is based upon the identifier number unique to each management circuit;

wherein the remote connector circuit receives the operating information from the management circuits via the communications bus and provides the operating information to the remote management system via the communications network.

54. The remote connector circuit of claim 53 further comprising:

a daughter card, the remote connector circuit being implemented on the daughter card.

55. The remote connector circuit of claim 53 wherein the daughter card further comprises:

an auxiliary connector, the communications bus connector circuit operably coupled to the communications bus via the auxiliary connector.

56. The remote connector circuit of claim 53 wherein:

the computer bus connector circuit is substantially compliant to a RS-485 standard.

57. The remote connector circuit of claim 53 wherein the network connector circuit includes a modem circuit.

58. The remote connector circuit of claim 57 wherein the communications network includes a telephone network.

59. The remote connector circuit of claim 53 wherein the communications network is a local area network (LAN) conforming to a LAN standard, wherein the remote connector circuit is compliant to the LAN standard.

60. The remote connector circuit of claim 53 wherein the at least one operating condition includes an environmental condition.

61. The remote connector circuit of claim 53 further comprising:

a controller;

a memory storing code, wherein the controller executes the code to poll the management circuits on the communications bus to receive the operating information.

62. The remote connector circuit of claim 53 further comprising:

computer bus connector circuit for operably coupling the remote connector circuit to a computer bus of a host computer system;

wherein the remote connector circuit is capable of providing the operating information to the host computer system via the computer bus.

* * * * *